United States Patent
Ertl et al.

[11] Patent Number: 6,022,399
[45] Date of Patent: Feb. 8, 2000

[54] PROCESS FOR THE ADSORPTION OF ORGANIC SUBSTANCES IN THE AIR

[75] Inventors: Harald Ertl, Geretsried; Sabine Kunz; Johann Göbel, both of München, all of Germany

[73] Assignee: Daimler Chrysler Ag., Stuttgart, Germany

[21] Appl. No.: 09/106,163

[22] Filed: Jun. 29, 1998

[30] Foreign Application Priority Data

Jun. 27, 1997 [DE] Germany .............................. 197 27 376

[51] Int. Cl.[7] .................................................... B01D 53/04
[52] U.S. Cl. ............................... 95/114; 95/143; 95/147; 95/148
[58] Field of Search ........................... 95/104, 105, 114, 95/115, 120, 126, 143, 147, 148; 96/126

[56] References Cited

U.S. PATENT DOCUMENTS

| | | | |
|---|---|---|---|
| 4,312,640 | 1/1982 | Verrando | 95/105 |
| 4,312,641 | 1/1982 | Verrando et al. | 95/105 |
| 4,322,394 | 3/1982 | Mezey et al. | 95/148 X |
| 5,282,886 | 2/1994 | Kobayashi et al. | 95/148 X |
| 5,346,535 | 9/1994 | Kuznicki et al. | 95/147 X |
| 5,429,665 | 7/1995 | Botich | 95/126 X |
| 5,536,301 | 7/1996 | Lansbarkis et al. | 95/147 X |
| 5,581,903 | 12/1996 | Botich | 95/126 X |

FOREIGN PATENT DOCUMENTS

| | | | |
|---|---|---|---|
| 61-101229 | 5/1986 | Japan | 96/126 |
| 61-271032 | 12/1986 | Japan | 95/148 |

*Primary Examiner*—Robert H. Spitzer
*Attorney, Agent, or Firm*—Ladas & Parry

[57] ABSTRACT

A process for regenerating an adsorber which adsorbs organic substances from the air in which the adsorber is heated by microwave energy to evaporate adsorbed organic substances on the adsorber. The adsorber is provided with enhanced microwave absorption capacity to enable the adsorber to evaporate the adsorbed organic substances. The adsorber can be produced to have itself high microwave energy absorbing capacity or a solid material can be combined with the adsorber to provide the high microwave absorbing capacity. The solid material can be combined with an adsorbing enhancing substance and can be a carrier therefor. In a particular embodiment, the adsorber can be a hydrophobic zeolite and the microwave absorbing material can be a hydrophilic zeolite.

11 Claims, No Drawings

PROCESS FOR THE ADSORPTION OF ORGANIC SUBSTANCES IN THE AIR

FIELD OF THE INVENTION

The invention relates to a process for the adsorption of organic substances in the air and particularly to a process in which an adsorption agent is included in an adsorber and the adsorption agent is regenerated for desorption of the organic substances by heating with microwave energy.

BACKGROUND

The desorption of organic substances in a regenerative operating adsorption plant is usually obtained by hot-gas or water-vapor desorption. Since the input of energy is related to volumetric flow, a concentrating of the desorbate is possible only to a limited extent. This process is not very efficient, particularly for hot-gas desorption, since the heat capacity of air is small, and the heat transfer between air and adsorption agent is unfavorable. For decreasing concentrations of pollutants, the energy requirement per unit quantity of separated pollutant increases. An energy justifiable operation of such a plant it thus only conditionally possible.

Since polar molecules, particularly water, absorb microwave energy, it is known to evaporate water with microwave energy. Other polar organic compounds, such as alcohols, which are adsorbed on an adsorption agent can be evaporated by microwave energy in order to regenerate the adsorption agent. Less polar or even nonpolar organic compounds, however, cannot be removed in this way. A number of nonpolar or less polar pollutants are, however, contained in the air, and these are adsorbed by the adsorption agent and thus must be desorbed again in order to regenerate the adsorption agent.

Nonpolar compounds in the air, are, for example, alkanes or other aliphatic hydrocarbons and aromatic hydrocarbons, such as, benzene.

SUMMARY OF THE INVENTION

An object of the invention is to provide a process of the above type in which an adsorption agent used for air purification and thus charged with various organic compounds can be completely regenerated by desorption with microwave energy.

The above and further objects are achieved according to the invention by combining a microwave absorbing material with the adsorption agent to achieve desorption of low or nonpolar pollutants with microwave energy.

DETAILED DESCRIPTION

According to the invention, an adsorption agent, which absorbs microwaves, is used for the desorption of pollutants. In contrast to the known process for desorption of water or alcohol, according to the invention, the adsorption agent is itself heated by microwaves. The adsorbed pollutants are evaporated, thus desorbed, by the thus heated adsorption agent. Thus, according to the invention, it does not matter whether the adsorbed pollutants are polar or nonpolar. They must only have a vapor pressure at the temperature which the adsorption agent is heated by the microwaves to be evaporated. This is the case without exception for the gaseous pollutants contained in the air. Thus, according to the invention, substantially 100% desorption will be obtained of the pollutants contained in the air with microwaves.

Zeolites have proven particularly suitable as adsorption agents for purifying air, especially hydrophobic zeolites. These zeolites have a high silicon/aluminum molar ratio whereas hydrophilic zeolites have a low silicon/aluminum molar ratio. The hydrophilic zeolites adsorb water but have only a small adsorption capacity for the organic pollutants contained in the air and are thus unsuitable for air purification.

On the other hand, the known hydrophobic zeolites do not possess a sufficient capacity for microwave absorption and hence are not capable of desorption of organic air pollutants by microwave energy.

According to the invention, the microwave absorption capacity of hydrophobic zeolites may, however, be increased. One way of doing so consists of reducing the silicon/aluminum ratio of the hydrophobic zeolites. For example, commercially available hydrophobic faujasite has a silicon/aluminum ratio of approximately 100, while commercially available hydrophilic faujasite has a silicon/aluminum ratio of approximately 1. If, as has been shown, the silicon/aluminium molar ratio of faujasite is reduced to below approximately 100, the absorption capacity of faujasite for microwave energy is increased such that faujasite can be applied according to the invention, without reducing the adsorption capacity in a detectable manner relative to organic pollutants in the air. Thus, preferably, according to the invention, a faujasite with a silicon/aluminum molar ratio between 50 and 90 is used.

Therefore, in accordance with the invention, the silicon/aluminum molar ratio of the zeolite should be at least 10 in order to assure, on the one hand, a sufficient pollutant adsorption capability and, on the other hand, sufficient microwave absorption.

In order to adjust the silicon/aluminum molar ratio to exceed 10, and preferably more than 30, and especially more than 50, the zeolite can be synthesized appropriately or a commercially available hydrophobic zeolite can be treated with water vapor or silicon tetrachloride in order to dissolve out aluminum and replace it with silicon.

Additionally, a sufficient microwave absorption capacity for the desorption of pollutants can be obtained for a hydrophobic zeolite by cation exchange.

The microwave absorption capacity of a hydrophobic zeolite is substantially increased if it is converted into the potassium form from the conventional sodium form. In addition, an ion exchange with catalytically active metals leads to an essential increase of the microwave absorption capacity of hydrophobic zeolites. Of these catalytically active metals, in particular, metals of the platinum group are suitable hydrogenating catalysts. Thus, suitable metals include platinum, palladium, rhodium and iridium, as well as silver and gold, and iron, copper (II), manganese, vanadium, titanium, calcium, magnesium, lanthanum and lanthanoids, as well as boron, which possess acidic or oxidative catalytic properties. Also, the properties of the thus ion-exchanged zeolites can be modified further for additional ion exchange with lithium, cesium, barium and strontium, so that their microwave absorption capacity is increased still further.

The incorporation of catalytic metals into the zeolite also has the consequence that catalytic properties will be endowed upon the zeolite. That is, in the case of desorption, a combustion of the adsorbed pollutants and thus an additional temperature increase can be obtained.

Hydrophobic zeolites, which may be utilized as adsorption agents according to the invention, are, for example, faujasite, mordenite or zeolite of the ZSM-5 type.

When the adsorption agent has become loaded with pollutants, it can be heated directly by microwave stimulation according to the invention, if it has a sufficient microwave absorption capacity. However, it is also possible according to the invention to utilize an adsorption agent, which does not by itself have a sufficient microwave absorption capacity, as long as another solid is present in the adsorber, which has in turn a high microwave absorption capacity and thus the adsorption agent is heated to a temperature sufficient for the desorption of pollutants.

The solid that absorbs microwaves may be, for example, a hydrophilic zeolite, activated carbon, a polymer, for example, a polyurethane, a polyamide or an ion-exchange resin, such as Amberlite® or a metal oxide, such as, a perovskite or a spinel, or another metal compound, for example, silicon carbide.

The adsorption agent may be present in mixture with the solid that absorbs microwaves.

For example, the absorber may be packed with a mixture of an adsorption agent of a (microwave-insensitive) hydrophobic zeolite and a hydrophilic zeolite as the solid that absorbs microwaves.

The proportion of hydrophilic zeolite should thus be as small as possible in order that it will have minimal adverse affect on the adsorption capacity of the adsorber. In general, 5 to 30 wt. % of hydrophilic zeolite is sufficient to assure microwave absorption of the adsorber and for desorption by microwave energy. Hydrophilic zeolites generally have a silicon/aluminum molar ratio of less than 10 and in particular less than 5. The water adsorbed on hydrophilic zeolites assists in the desorption of the other adsorbed substances.

Activated carbon has a high microwave-absorption capacity. However, it cannot be used as such in an adsorber, whose adsorption agent is desorbed in air by microwaves, since it would ignite immediately. According to the process of the invention, however, activated carbon may be utilized in mixture with a microwave-insensitive adsorption agent, particularly with hydrophobic zeolite. The proportion of activated carbon in the mixture with hydrophobic zeolite should, amount to at most 30 wt. %.

It is also possible according to the invention to utilize the microwave-insensitive adsorption agent on a carrier made of a material that absorbs microwaves. The carrier may be, for example, a polyurethane, particularly a polyurethane foam, ceramics, a metal oxide or silicon carbide. The carrier may be a monolithic material with air-passage channels. It is also possible to use a microwave-insensitive carrier material, which is coated with microwave-sensitive adsorption agents.

The frequency utilized for microwave desorption is in the range of 100 MHz to 100 GHz; and preferably is 2.45 GHz.

The process according to the invention may be employed for purifying the air inside buildings, particularly in living rooms and bedrooms of homes and in shelters. The process may be used for protection from contaminated outside air, as well as in airplanes and in the cabins of motor vehicles.

Although the invention has been described in conjunction with specific embodiments thereof, it will become apparent to those skilled in the art that numerous modifications and variations can be made within the scope and spirit of the appended claims.

What is claimed is:

1. A process for regenerating an adsorber which adsorbs organic substances from the air comprising:

forming said adsorber as a hydrophobic zeolite having a molar ratio of silicon/aluminum of at least 10 and less than 100, heating the adsorber by microwave energy to evaporate adsorbed organic substances on the adsorber, and providing said adsorber with enhanced microwave absorption capacity to enable the adsorber to evaporate said adsorbed organic substances.

2. A process as claimed in claim 1, wherein said enhanced microwave absorption capacity is obtained by combining a microwave absorbing material in said adsorber.

3. A process as claimed in claim 2, wherein said microwave absorbing material comprises a solid material.

4. A process as claimed in claim 3, wherein said solid material is a hydrophilic zeolite, activated carbon, a polymer or a metal oxide or other metal compound.

5. A process as claimed in claim 2, wherein said microwave absorbing material is mixed with said hydrophobic zeolite.

6. A process as claimed in claim 5, wherein said microwave absorbing material is present in the mixture in an amount of up to 30% by wt.

7. A process as claimed in claim 5, wherein the microwave absorbing material comprises solid hydrophilic zeolite.

8. A process as claimed in claim 5, wherein the microwave absorbing material is a carrier for the hydrophobic zeolite.

9. A process as claimed in claim 1, wherein said hydrophobic zeolite has undergone ion-exchange with potassium or a catalytically effective metal.

10. A process as claimed in claim 1, wherein said hydrophobic zeolite has undergone ion-exchange with potassium, lithium, cesium or barium.

11. A process as claimed in claim 1, wherein said zeolite is faujasite, mordenite or a zeolite of the ZSM-5 type.

* * * * *